United States Patent
Kim

(10) Patent No.: US 10,619,719 B2
(45) Date of Patent: Apr. 14, 2020

(54) TRANSMISSION SHAFT SUPPORT APPARATUS

(71) Applicant: HYUNDAI DYMOS INCORPORATED, Seosan-si (KR)

(72) Inventor: Moo Han Kim, Suwon-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 0 days.

(21) Appl. No.: 16/188,521

(22) Filed: Nov. 13, 2018

(65) Prior Publication Data

US 2019/0195332 A1 Jun. 27, 2019

(30) Foreign Application Priority Data

Dec. 26, 2017 (KR) .......................... 10-2017-0179461

(51) Int. Cl.
*F16H 57/021* (2012.01)
*F16H 3/00* (2006.01)
*F16H 3/091* (2006.01)

(52) U.S. Cl.
CPC ........... *F16H 57/021* (2013.01); *F16H 3/006* (2013.01); *F16H 3/0915* (2013.01)

(58) Field of Classification Search
CPC ....... F16H 3/006; F16H 3/0915; F16H 57/021
See application file for complete search history.

(56) References Cited

U.S. PATENT DOCUMENTS

| | | | | |
|---|---|---|---|---|
| 4,033,197 A | * | 7/1977 | Shikiya | F16H 3/30 74/331 |
| 7,210,367 B2 | * | 5/2007 | Akutagawa | F16H 3/006 74/331 |
| 2006/0096414 A1 | * | 5/2006 | Gochenour | F16D 21/06 74/732.1 |
| 2008/0184846 A1 | * | 8/2008 | Jackson | F16H 3/006 74/732.1 |
| 2009/0266199 A1 | * | 10/2009 | Jackson | F16H 3/006 74/665 D |
| 2016/0076626 A1 | * | 3/2016 | Hose | F16H 3/006 74/665 K |

FOREIGN PATENT DOCUMENTS

| | | |
|---|---|---|
| JP | 04-023858 U | 2/1992 |
| JP | 2015-521725 A | 7/2015 |
| KR | 10-1348549 B1 | 1/2014 |

* cited by examiner

*Primary Examiner* — Richard W Ridley
*Assistant Examiner* — Brian J McGovern
(74) *Attorney, Agent, or Firm* — Baker & Hostetler LLP; Hyunho Park

(57) ABSTRACT

A transmission shaft support apparatus according to an exemplary embodiment of the present invention includes: a first support member which is coupled in a section of a main shaft between a first gear and a second gear coupled in a front section of the main shaft and supports the main shaft; a second support member which is coupled in a section of the main shaft at a rear side of the second gear after the first support member, and supports the main shaft; and a third support member which is coupled in a rear section of the main shaft after the second support member, and supports the main shaft.

6 Claims, 1 Drawing Sheet

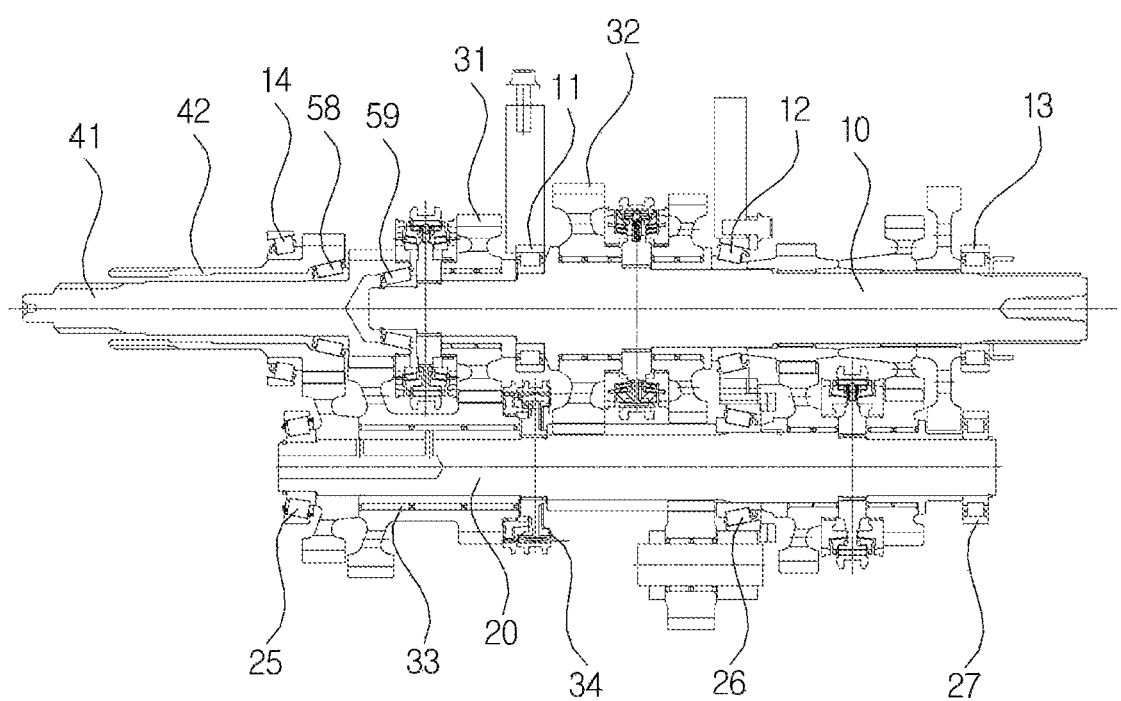

TRANSMISSION SHAFT SUPPORT APPARATUS

CROSS-REFERENCE TO RELATED APPLICATIONS

This application claims priority to and the benefit of Korean Patent Application No. 10-2017-0179461 filed in the Korean Intellectual Property Office on Dec. 26, 2017, the entire contents of which are incorporated herein by reference.

TECHNICAL FIELD

The present invention relates to a transmission shaft support apparatus that supports a weight of a main shaft, a weight of a counter shaft, a load applied to the main shaft, and a load applied to the counter shaft.

BACKGROUND ART

In general, a manual transmission needs to be operated by a driver in accordance with a road condition or a traveling speed. The manual transmissions are classified into a selective gear type manual transmission configured such that gear teeth of a gear shift stage selected by an operation of a shift lever mesh with one another, and an always meshing type manual transmission configured such that a gear on a main shaft and a gear of an auxiliary shaft always mesh with each other. In addition, a dual clutch transmission (DCT) allows a gear shift operation to be automatically performed through an operation of a gear actuator and an operation of a clutch actuator, and the dual clutch transmission has an advantage in that efficiency is high and the gear shift operation is quickly performed.

However, in the case of a rear wheel manual transmission or the dual clutch transmission (DCT) in the related art, a housing is supported at two or three points. For this reason, a degree of sagging of a shaft in the transmission is increased, which causes deterioration in durability and an increase in noise.

DOCUMENT OF RELATED ART

Patent Document (Patent Literature 1) Korean Patent No. 10-1348549 (published on Jan. 8, 2014)

SUMMARY OF THE INVENTION

The present invention has been made in an effort to provide a transmission shaft support apparatus in which multiple support members support a main shaft and a counter shaft to prevent the main shaft and the counter shaft from sagging, thereby improving durability and preventing noise by reducing a degree of sagging.

An exemplary embodiment of the present invention provides a transmission shaft support apparatus including: a first support member which is coupled in a section of a main shaft between a first gear and a second gear coupled in a front section of the main shaft and supports the main shaft; a second support member which is coupled in a section of the main shaft at a rear side of the second gear after the first support member, and supports the main shaft; and a third support member which is coupled in a rear section of the main shaft after the second support member, and supports the main shaft.

The first to third support members may be roller bearings and supported on a transmission housing.

A front end of the main shaft may be connected to a first pinion drive, the first pinion drive may be inserted into a second pinion drive, and a fourth support member may be provided in a rear section of the second pinion drive positioned at a front side of the main shaft and may support the second pinion drive.

The fourth support member may be a roller bearing and supported on a transmission housing.

The transmission shaft support apparatus may further include: a fifth support member which is coupled in a front section of a counter shaft connected to the main shaft to transmit power, and supports the counter shaft; a sixth support member which is coupled in a section of the counter shaft that corresponds to the second support member after the fifth support member, and supports the counter shaft; and a seventh support member which is coupled in a rear section of the counter shaft that corresponds to the third support member after the sixth support member, and supports the counter shaft.

The fifth to seventh support members may be roller bearings and supported on a transmission housing.

According to the transmission shaft support apparatus according to the exemplary embodiment of the present invention, the multiple support members support the main shaft and the counter shaft, thereby preventing the main shaft and the counter shaft from sagging.

The present invention may improve durability because a degree of sagging of the main shaft and the counter shaft is reduced.

The present invention may prevent noise of the main shaft and the counter shaft.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a view illustrating an entire configuration of a transmission shaft support apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. Further, exemplary embodiments of the present invention will be described below, but the technical spirit of the present invention is not limited thereto and may of course be modified and variously carried out by those skilled in the art.

A main shaft of a transmission in the related art is supported by a housing (not illustrated) through a main shaft front bearing seated on a pinion drive. A pilot bearing at a front side of the main shaft is supported inside the pinion drive. One end of the main shaft is supported by the pilot bearing. The other end of the main shaft is supported by a main shaft rear bearing. One end of a counter shaft is supported by a counter shaft front bearing. The other end of the counter shaft is supported by a counter shaft rear bearing. Because of these structural characteristics of the transmission in the related art, a degree of sagging of an intermediate portion of each of the main shaft and the counter shaft is increased, and for this reason, gear teeth excessively mesh with one another, which causes noise and a reduction in lifespan.

A transmission shaft support apparatus according to an exemplary embodiment of the present invention supports a main shaft and a counter shaft by using support members such as roller bearings at four points for the main shaft and at three points for the counter shaft, thereby reducing a degree of sagging of the main shaft and the counter shaft.

First, a configuration of a transmission shaft support apparatus according to the exemplary embodiment of the present invention will be described.

As illustrated in FIG. 1, the transmission shaft support apparatus according to the exemplary embodiment of the present invention includes a first support member 11, a second support member 12, and a third support member 13 which are coupled to and support a main shaft 10 so that the main shaft 10 is rotatable. The transmission shaft support apparatus further includes a fourth support member 14 coupled to a second pinion drive 42 positioned at a front side of the main shaft 10. The transmission shaft support apparatus further includes a fifth support member 25, a sixth support member 26, and a seventh support member 27 which are coupled to a counter shaft 20 connected to the main shaft 10 to transmit power, and support the counter shaft 20 so that the counter shaft 20 is rotatable.

Specifically, the first to seventh support members 11, 12, 13, 14, 25, 26, and 27 may be roller bearings. The first to seventh support members 11, 12, 13, 14, 25, 26, and 27 may be supported on a transmission housing.

The first support member 11 is coupled in a section of the main shaft 10 between a first gear 31 and a second gear 32 coupled in a front section of the main shaft 10. The first gear 31 and the second gear 32 may be shift gears.

The second support member 12 is installed at an approximately intermediate portion of the main shaft 10. The second support member 12 is coupled in a section of the main shaft 10 after the first support member 11. The second support member 12 is positioned at a rear side of the second gear 32.

The third support member 13 is coupled in a rear section of the main shaft 10 after the second support member 12.

Both ends of the main shaft 10 are supported by the first support member 11 and the third support member 13.

A front end of the main shaft 10 is connected to a first pinion drive 41. The first pinion drive 41 is inserted into the second pinion drive 42.

The fourth support member 14 is coupled in a rear section of the second pinion drive 42 positioned at the front side of the main shaft 10. The fourth support member 14 supports the second pinion drive 42 so that the second pinion drive 42 is rotatable.

The fifth support member 25 is coupled in a front section of the counter shaft 20 connected to the main shaft 10 to transmit power, and supports the counter shaft 20 so that the counter shaft 20 is rotatable.

The sixth support member 26 is coupled in a section of the counter shaft 20 at a rear side of the fifth support member 25. The sixth support member 26 may be coupled in the section of the counter shaft 20 that corresponds to the second support member 12. The sixth support member 26 supports the counter shaft 20 so that the counter shaft 20 is rotatable.

The seventh support member 27 is coupled in a section of the counter shaft 20 at a rear side of the sixth support member 26. The seventh support member 27 may be coupled in the section of the counter shaft 20 that corresponds to the third support member 13. The seventh support member 27 serves to support the counter shaft 20 so that the counter shaft 20 is rotatable.

A third gear 33 and a synchro 34 for a gear shift operation may be coupled to the counter shaft 20. The third gear 33 and the synchro 34 on the counter shaft 20 are identical to those in a transmission mechanism in the related art.

Meanwhile, an eighth support member 58 may be coupled at a rear inner side of the second pinion drive 42. A front end of the main shaft 10 may be rotatably supported by a ninth support member 59. The eighth support member 58 and the ninth support member 59 may be roller bearings. The eighth support member 58 may be supported on the second pinion drive 42. The ninth support member 59 may be supported on the first pinion drive 41.

Next, an operation of the transmission shaft support apparatus according to the exemplary embodiment of the present invention will be described.

As illustrated in FIG. 1, the first support member 11, which is provided at the most front side of the main shaft 10 among the support members of the main shaft 10, supports the main shaft 10 between the first gear 31 and the second gear 32 so that the main shaft 10 is rotatable. The third support member 13 supports the main shaft 10 at the rear side of the main shaft 10 so that the main shaft 10 is rotatable.

A radial load of the main shaft 10 may be supported by the first support member 11 and the third support member 13. An axial load of the main shaft 10 may be supported by the fourth support member 14 and the second support member 12.

Axial and radial loads of the counter shaft 20 are supported by the fifth support member 25 and the sixth support member 26, and further, the seventh support member 27 may support the radial load of the counter shaft 20.

Since the synchro 34, which synchronizes the counter shaft 20 and the third gear 33 seated on the counter shaft 20, is positioned between the third gear 33 and the second gear 32 which are shift gears, it is possible to obtain an effect of reducing an overall length of a vehicle by utilizing a space remaining below the first support member 11 at the side of the main shaft 10.

As described above, according to the transmission shaft support apparatus according to the exemplary embodiment of the present invention, the multiple support members support the main shaft and the counter shaft, thereby preventing the main shaft and the counter shaft from sagging. In addition, it is possible to improve durability because a degree of sagging of the main shaft and the counter shaft is reduced. In addition, it is possible to prevent noise of the main shaft and the counter shaft.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A transmission shaft support apparatus comprising:
    a first support member which is coupled in a front section of a main shaft between a first gear and a second gear and supports the main shaft;
    a second support member which is coupled in an intermediate section of the main shaft at a rear side of the second gear after the first support member, and supports the main shaft; and
    a third support member which is coupled in a rear section of the main shaft after the second support member, and supports the main shaft.

2. The transmission shaft support apparatus of claim 1, wherein the first, second, and third support members are roller bearings.

3. The transmission shaft support apparatus of claim 1, further comprising:
    a fourth support member, wherein a front end of the main shaft is connected to a first pinion drive, the first pinion drive is inserted into a second pinion drive, and the fourth support member is provided in a rear section of the second pinion drive positioned at a front side of the main shaft and supports the second pinion drive.

4. The transmission shaft support apparatus of claim 3, wherein the fourth support member is a roller bearing.

5. The transmission shaft support apparatus of claim 3, further comprising:
    a fifth support member which is coupled in a front section of a counter shaft connected to the main shaft to transmit power, and supports the counter shaft;
    a sixth support member which is coupled in an intermediate section of the counter shaft that corresponds to the second support member after the fifth support member, and supports the counter shaft; and
    a seventh support member which is coupled in a rear section of the counter shaft that corresponds to the third support member after the sixth support member, and supports the counter shaft.

6. The transmission shaft support apparatus of claim 5, wherein the fifth, sixth, and seventh support members are roller bearings.

* * * * *